United States Patent [19]

Spietschka et al.

[11] Patent Number: 4,831,140

[45] Date of Patent: May 16, 1989

[54] PROCESS FOR THE PREPARATION OF ARYLIMIDES OF PERYLENE-3,4,9,10-TETRACARBOXYLIC ACID

[75] Inventors: Ernst Spietschka, Idstein/Taunus; Helmut Tröster, Königstein/Taunus, both of Fed. Rep. of Germany

[73] Assignee: Hoechst Aktiengesellschaft, Frankfurt, Fed. Rep. of Germany

[21] Appl. No.: 850,847

[22] Filed: Apr. 11, 1986

[30] Foreign Application Priority Data

Apr. 15, 1985 [DE] Fed. Rep. of Germany ....... 3513358

[51] Int. Cl.⁴ .......................................... C07D 491/06
[52] U.S. Cl. ....................................... 546/37; 534/656
[58] Field of Search ........................... 546/37; 534/656

[56] References Cited

U.S. PATENT DOCUMENTS

| 2,905,685 | 9/1959 | Eckert et al. | 546/37 |
| 3,332,931 | 7/1967 | Braun et al. | 546/37 |
| 3,357,983 | 12/1967 | Weaner et al. | 546/37 |
| 3,661,912 | 9/1972 | Kalz et al. | 546/37 |
| 4,496,731 | 1/1985 | Spietschka et al. | 546/37 |
| 4,594,420 | 6/1986 | Spierschka et al. | 546/29 |

FOREIGN PATENT DOCUMENTS

| 55363 | 10/1981 | European Pat. Off. | 546/37 |
| 3309060 | 9/1984 | Fed. Rep. of Germany | 546/37 |
| 3436206.1 | 10/1984 | Fed. Rep. of Germany | . |
| 897707 | 5/1962 | United Kingdom | . |

*Primary Examiner*—Donald G. Daus
*Assistant Examiner*—Andrew G. Rozycki

[57] ABSTRACT

Process for the preparation of compounds of the formula (1)

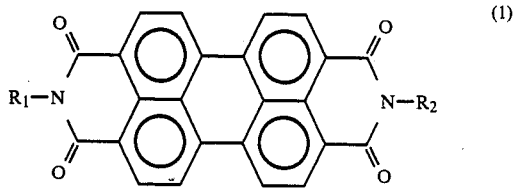

in which $R_1$ denotes a phenyl or naphthyl radical which can be substituted by alkyl, cycloalkyl, alkoxy, aryloxy, arylazo or nitro groups or halogen atoms, and $R_2$ denotes a hydrogen atom or a phenyl or naphthyl radical which can be substituted by alkyl, cycloalkyl, alkoxy, aryloxy, arylazo or nitro groups or halogen atoms, or denotes an alkyl ($C_1$–$C_8$) radical, by condensation, at between 100° C. and 300° C., of perylene-3,4,9,10-tetracarboxylic dianhydride or a monoanhydride monoimide of the formula (2)

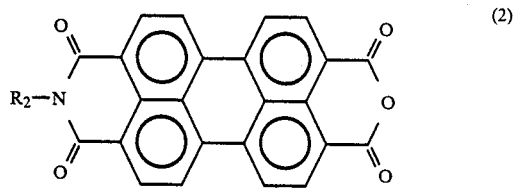

in which $R_2$ has the abovementioned meaning, with an arylamine of the formula (3)

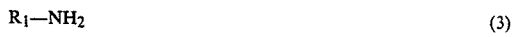

in which $R_1$ has the abovementioned meaning, in the presence of dialkylamines of the formula (4)

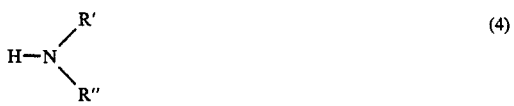

in which R' and R" denote straight-chain alkyl $C_1$–$C_6$ or branched alkyl $C_3$–$C_6$ or cycloalkyl $C_5$–$C_6$ groups, which can be substituted by hydroxyl, alkoxy $C_1$–$C_4$, alkyl $C_1$–$C_4$ amino, or phenyl or naphthyl groups which can be substituted on the aromatic nucleus by alkyl $C_1$–$C_4$, alkoxy $C_1$–$C_4$ or alkyl $C_1$–$C_4$-amino groups or halogen atoms, and in which R' and R" can form with the nitrogen atom a 5- or 6-membered heterocyclic ring.

7 Claims, No Drawings

PROCESS FOR THE PREPARATION OF ARYLIMIDES OF PERYLENE-3,4,9,10-TETRACARBOXYLIC ACID

The invention relates to an improved process for the preparation of arylimides of perylene-3,4,9,10-tetracarboxylic acid by use of compounds which act to increase the reaction rate of the condensation, which is known per se, of perylene-3,4,9,10-tetracarboxylic dianhydride or a perylene-3,4,9,10-tetracarboxylic monoanhydride monoimide with a primary arylamine and, at the same time, avoid the disadvantages associated with the condensation auxiliaries hitherto used.

It is known that diarylimides of perylene-3,4,9,10-tetracarboxylic acid, of the formula

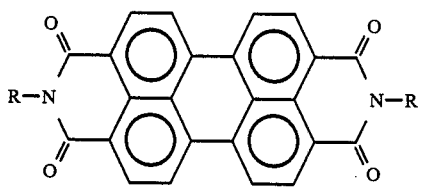

(R in this denotes an aryl radical), are obtained by reaction (condensation) of perylene-3,4,9,10-tetracarboxylic dianhydride with primary arylamines, these diarylimides including valuable coloring agents.

It is furthermore known with this condensation reaction to add acidic agents which eliminate water, such as hydrochloric or sulfuric acid, or heavy metal salts, such as zinc chloride or zinc or cadmium carboxylates, to increase the reaction rate—especially when less reactive arylamines are used (German Patent Nos. 1,067,157 (=U.S. Pat. No. 2,905,685), 1,105,085 (=U.K. Patent No. 897,707), 1,230,946 (=U.S. Pat. No. 3,332,931); German Auslegeschrift No. 1,094,897 and German Auslegeschrift No. 1,807,729). However, all these condensation auxiliaries entail disadvantages which make the industrial manufacture of such coloring agents difficult. The following may be mentioned in this context: corrosion problems, for example when hydrochloric acid or zinc chloride are used, losses of the amine components, some of which are costly, by side reactions—thus, the formation of bisarylamine and cycloarylamine can be detected on catalysis with sulfuric acid—or acylation of the amine component when heavy metal carboxylates are used, such as zinc acetate, together with the necessity to separate off again the heavy metals by additional measures in accordance with the ecological requirements.

It has been found that arylmides of perylene-3,4,9,10-tetracarboxylic acid, of the formula (1)

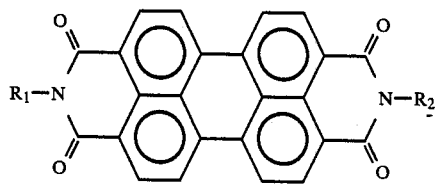

in which $R_1$ denotes an aryl radical such as, for example, a phenyl or naphthyl radical which can be substituted on the aromatic nucleus by optionally substituted alkyl, cycloalkyl, alkoxy, aryloxy, arylazo or nitro groups or halogen atoms, and $R_2$ denotes a hydrogen atom or an optionally substituted alkyl $C_1$–$C_8$ or aryl radical such as, for example, a phenyl or naphthyl radical which can be substituted on the aromatic nucleus by optionally substituted alkyl, cycloalkyl, alkoxy, aryloxy, arylazo or nitro groups or halogen atoms, it being possible for $R_1$ and $R_2$, if both denote an aryl radical, to be identical or different, can be prepared in an advantageous manner by condensation, at temperatures from 100° to 300° C., preferably from about 110° to about 250° C., of perylene-3,4,9,10-tetracarboxylic dianhydride or a perylene-3,4,9,10-tetracarboxylic monoanhydride monoimide of the formula (2)

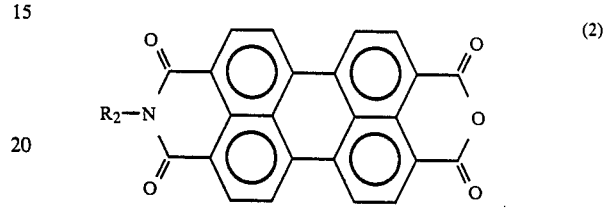

in which $R_2$ has the abovementioned meaning, with a primary arylamine of the formula (3)

$R_1$—$NH_2$ (3)

in which $R_1$ has the abovementioned meaning, in the presence of dialkylamines of the formula (4)

in which R' and R" denote identical or different straight-chain alkyl $C_1$–$C_6$ or branched alkyl $C_3$–$C_6$ or cycloalkyl $C_5$–$C_6$ groups, which can be substituted by hydroxyl, alkoxy $C_1$–$C_4$ alkyl $C_1$–$C_4$ amino, or aryl groups such as, for example, phenyl or naphthyl groups which can be substituted on the aromatic nucleus by alkyl $C_1$–$C_4$ alkoxy $C_1$–$C_4$ or alkyl $C_1$–$C_4$ amino groups or halogen atoms, an in which R' and R" form, together with the nitrogen atom, a 5- or 6-membered heterocyclic ring, for example a piperidine, piperzine, morpholine or pyrrolidine ring, which is optionally substituted by lower alkyl groups or a phenyl group.

The dialkylamines of the said formula (4) are outstandingly suitable as catalysts for the condensation reaction under discussion. Their action in increasing the reaction rate is comparable to that of the condensing agents which are mentioned above and have hitherto been used, without having their disadvantages. After the reaction is complete, they can be recovered by distillation from the mother liquors of the reaction in a straightforward and ecologically advantageous manner, where appropriate together with the excess arylamine of the said formula (3) and an inert diluent which has been added where appropriate, and can thus be passed on directly for reuse. However, they can also be used themselves advantageously as reaction medium in place of a diluent. No side reactions have been observed in this.

Since condensation reactions of the type under discussion usually take place quantitatively, there is the additional possibility of isolation of the formed reaction product in a particularly economic manner, avoiding industrially elaborate filtration from the organic medium with subsequent drying, by removing the volatiles from the reaction mixture by distillation after reaction is complete, the product of the process being obtained in pure form as the dry residue from the distillation.

Examples of suitable dialkylamines of the said formula (4) are dimethylamine, dipropylamine, dihexylamine, diisopropylamine and diisobutylamine, also N-methyl-n-butylamine, di(2-ethylhexyl)amine, dicyclohexylamine, diethanolamine, dipropanolamine, N-alkyl $\overline{C_1-C_6}$-ethanolamine, cyclohexylethanolamine, N-methylamino- and N-ethylamino-2-propanol, N-methylamino-2,3-propanediol, dimethylethylenediamine, N-benzylmethylamine, N-benzylethylamine, N-isopropylbenzylamine, N-benzylethanolamine, dibenzylamine, piperidine, sym.-3,5-dimethylpiperidine, 3-(hydroxymethyl)piperidine, 2-ethylpiperidine, 4-benzylpiperidine, piperazine, N-methylpiperazine, N-phenylpiperazine, 2,6-dimethylpiperazine, morpholine, 2,6-dimethylmorpholine and pyrrolidine.

0.05 mol of dialkylamine per mol of perylene-3,4,9,10-tetracarboxylic dianhydride are adequate in the condensation reaction to achieve a pronounced increase in the reaction rate. However, between about 0.1 mol and about 5 mol of dialkylamine per mol of dianhydride or monoanhydride monoimide is preferably used. It is also possible, however, to use considerably larger amounts, which is particularly advisable when the intention is that the dialkylamine simultaneously acts as the diluent. In general, the upper limit of the amount used will be determined only by economic aspects. It is advantageous to use a dialkylamine of the formula (4) which has a boiling point from about 100° C. to about 300° C.

It is noteworthy that tertiary alkylamines such as, for example, triethylamine or triethanolamine, in contrast, show no action corresponding to that of the dialkylamines which are used according to the invention. It was surprising, and could not have been foreseen, that secondary alkylamines are suitable as catalysts for the condensation reaction under discussion, since it was to be expected that, owing to preferential reaction of the anhydride or monoanhydride monoimide with the more strongly basic dialkylamine, the reaction with the weaker arylamine base (formula 3), and thus the formation of the arylimides (formula 1), would be impeded.

The condensation according to the invention can, where appropriate, also be carried out under pressure. The reaction can be carried out with the addition of inert diluents such as dimethylformamide, N-methylpyrrolidone, o-dichlorobenzene, nitrobenzene, quinoline or 2-ethylhexanol. However, the reaction is preferably carried out without the addition of further diluents in the relevant mixture of arylamine (formula 3) and dialkylamine (formula 4). The reaction time is about 0.5–12 hours.

The reaction product can be removed by filtration in a customary manner, where appropriate after dilution of the reaction mixture, for example with a low-boiling alcohol such as methanol. However, it is ecologically advantageous and especially industrially economic to remove, after quantitative reaction, the mixture of excess arylamine and dialkylamine by distillation, where appropriate in vacuo, so that the reaction product remains as the dry residue. Industrial equipment such as, for example, a drying tray or paddle drier is particularly suitable for this procedure. The product which results from this is a fine powder which can be used directly for any finishing operations which are still necessary. When the process is carried out under atmospheric pressure, the water which is eliminated during the reaction being removed continuously by distillation, the boiling range of the dialkylamine selected will be above the reaction temperature.

The starting materials of the formula (2) can be obtained by the processes described in German Offenlegungsschrift Nos. 3,017,185 and 3,309,060.

Examples of suitable arylamines of the formula (3) are aniline, 2-, 3- and 4-methylaniline, 2,5-, 3,4- and 3,5-dimethylaniline, 4-isopropylaniline, 4-cyclohexylaniline, 4-methoxy-2-methylaniline, 4-methoxy- and 4-ethoxyaniline, 2,4- or 2,5-dimethoxyaniline, 3- or 4-chloro-, bromo- or iodoaniline, 4-fluoroaniline, 3,5-bis-trifluoromethylaniline, 2,4- and 3,5-dichloroaniline, 2-methyl-5-chloroaniline, 3- and 4-nitroaniline, 4-phenoxy-, 4-(4'chlorophenoxy)- and 4-('-methoxyphenoxy)-aniline, 4-aminoazobenzene, 3-aminobenzanthrone, 1-aminopyrene or 2-aminoanthraquinone.

Various crystalline modifications can be obtained from some products of the process which exhibit polymorphic behavior, depending on the nature and amount of the dialkylamine used and the reaction temperature. Thus, for example, it is possible to prepare by the process according to the invention, in a direct route and in particularly advantageous manner, without intermediate isolation of the α-modification with a subsequent phase transition, not only the α-modification, which has long been known, of the N,N-bis-3',5'dimethylphenylimide of perylene-3,4,9,10-tetracarboxylic acid but also the β-and γ-modifications which have recently been disclosed (CA 84, 166251s; European Patent 0,023,191A1) which are lkkewise valuable pigments.

The examples which follow illustrate the procedures according to the invention. Unless otherwise indicated, the stated percentage data relate to weight.

EXAMPLE 1

A mixture of 39.2 g (0.1 mol) of perylene-3,4,9,10-tetracarboxylic dianhydride, 200 g (1.6 mol) of 3,5-dimethylaniline and 1.0 g (0.0095 mol) of diethanolamine is stirred at 180° C. for 6 hours, continuously driving off the water of reaction with a slow stream of nitrogen. The reaction mixture is then diluted at 60° C. with 200 ml of methanol, and the reaction product is isolated by filtration. The red crystalline product is washed with methanol, and the filter cake which is moist with methanol is treated with 600 ml of 5% strength potassium hydroxide solution at 80° C. for 1 hour and is then filtered off with suction, washed to neutrality with hot water and finally dried.

58.3 g of the diimide of the formula (1) with

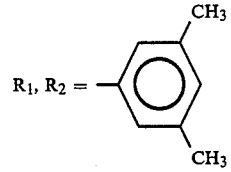

in the α-modification, which corresponds to a yield of 97.5% of theory, are obtained.

COMPARISON EXAMPLE 1a

When Example 1 is carried out without the addition of diethanolamine, 25.1 g of the same final product are obtained, which corresponds to a yield of 42.0% of theory.

EXAMPLE 2

19.6 g (0.05 mol) of perylene-3,4,9,10-tetracarboxylic dianhydride are treated with a solution of 21.0 g (0.2 mol) of diethanolamine in 97 g (0.8 mol) of 3,5-xylidine at 180° C. for 1 hour. After working up as in Example 1, the reaction product, which is chemically identical to the product obtained in Example 1 but is in the β-crystalline phase, is obtained in the form of crystals of pure scarlet-red.

29.5 g are obtained, which corresponds to a yield of 98.7% of theory.

EXAMPLE 3

If the process is carried out as in Example 1 but with the difference that 34.8 g (0.4 mol) of N-butylmethylamine are used in place of diethanolamine, and the reaction time at 120° C. is 2 hours, then 54.9 g of the same chemical product but in the form of the red γ-modification which has a blue tint are obtained, which corresponds to a yield of 91.8% of theory.

EXAMPLE 4

If the process is carried out as indicated in Example 1 but with the difference that the diethanolamine is replaced by 8.7 g (0.1 mol) of morpholine, and reaction is allowed to continue for 6 hours at 120° C., then 59.0 g of the same chemical product, but in the γ-crystal form, are obtained, which corresponds to a yield of 98.7% of theory.

A similar result is obtained when, with the same procedure, 34.0 g of piperidine (0.4 mol) or 40.0 g of N-methylpiperazine (0.4 mol) are used in place of the morpholine.

EXAMPLE 5

A suspension of 19.6 g (0.05 mol) of perylene-3,4,9,10-tetracarboxylic dianhddride, 20.0 g (0.16 mol) of 3,5-dimethylaniline and 200 g (1.9 mol) of diethanolamine is heated at 180°-190° C. After a reaction time of 3 hours, the reaction product is isolated as stated in Example 1. 26.6 g of the reaction product obtained as in Example 3 are obtained, which corresponds to a yield of 89.0% of theory.

EXAMPLE 6

A mixture of 19.6 g (0.05 mol) of perylene-3,4,9,10-tetracarboxylic dianhydride, 171.8 g (0.75 mol) of 3,5-bistrifluoromethylaniline and 25.0 g (0.24 mol) of diethanolamine is allowed to react at 180° C. for 4 hours. After the usual working up (see Example 1), 37.4 g of reaction products of pure orange colour, of the formula (1) with

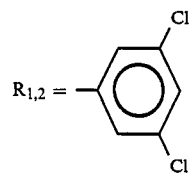

are obtained, which corresponds to a yield of 91.9% of theory.

EXAMPLE 7

If the process is carried out as described in Example 6 but with the difference that the 3,5-bistrifluoromethylaniline is replaced by 118.3 g of 3,5-dichloroaniline then 31.8 g of the corresponding diimide of the formula (1) with

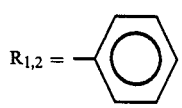

are obtained as dark violet crystals, which corresponds to a yield of 97.4% of theory.

EXAMPLE 8

If the process is carried out as described in Example 6 but with the difference that the 3,5-bistrifluoromethylaniline is replaced by 70 g of aniline, and reaction is allowed to continue for 2 hours, then 53.0 g of the dark red, with a blue tint, microcrystalline bisphenylimide of the formula (1) with

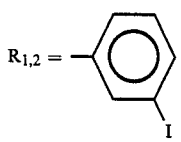

are obtained, which corresponds to a yield of 97.8% of theory.

EXAMPLE 9

A suspension of 19.6 g (0.05 mol) of perylene-3,4,9,10-tetracarboxylic dianhydride, 150 g (0.69 mol) of 3-iodoaniline and 2.3 g (0.025 mol) of 2-ethylaminoethanol is stirred at 180° C. for 2 hours. After the usual isolation (see Example 1), 38.6 g of reaction product of pure red, of the formula (1) with

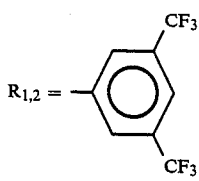

are obtained, which corresponds to a yield of 97.3% of theory.

EXAMPLE 10

39.2 g (0.1 mol) of perylene-3,4,9,10-tetracarboxylic dianhydride and 78.8 g (0.4 mol) of 4-aminoazobenzene in 180 g (1.7 mol) of diethanolamine are allowed to react at 180°-190° C. for 5 hours. The mixture is then diluted, at 80° C., with 400 ml of methanol, and the red reaction product is isolated as indicated in Example 1. 68.3 g of the bisazo derivative of the formula (1) with

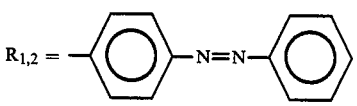

are obtained, which corresponds to a yield of 91.1% of theory.

EXAMPLE 11

98.0 g (0.25 mol) of perylene-3,4,9,10-tetracarboxylic dianhydride, 6.1 g (0.05 mol) of N-benzylmethylamine and 302 g (2.5 mol) of 3,5-dimethylaniline are stirred at 180° C., continuously removing the water eliminated in the reaction by distillation in a slow stream of nitrogen, in a 1 L V2A steel flat flange vessel with anchor agitator. Tetracarboxylic acid is no longer detectable in a sample taken after 6 hours and treated with hot 5% strength potassium hydroxide solution. The mixture of amine is removed by vacuum distillation (down to 3 mbar) from the reaction product which has been formed virtually quantitatively. The dry crystalline red residue, which is identical to the product from Example 1, contains <0.01% of amine. 148.6 g are obtained, which corresponds to a yield of 99.4% of theory.

If the 3,5-dimethylaniline is replaced by 321 g (3 mol) of 4-methylaniline and the process is otherwise carried out analogously, the 142.0 g of the corresponding red reaction product, with a blue tint, of the formula (1) with

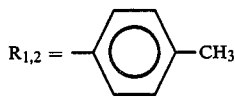

are obtained, which likewise corresponds to a yield which is almost 100% of theory.

EXAMPLE 12

A suspension of 19.6 g (0.05 mol) of perylene-3,4,9,10-tetracarboxylic dianhydride, 25.5 g (0.2 mol) of 3-chloroaniline, 25.4 g (0.2 mol) of N-butylethanolamine and 80 ml of o-dichlorobenzene are stirred at 160°–170° C. for 12 hours. After working up as in Example 1, 27.8 g of claret-colored reaction product of the formula (2) with

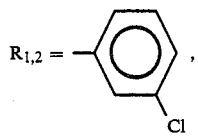

are obtained, which corresponds to a yield of 91.0% of theory.

COMPARISON EXAMPLE 12a

If Example 12 is repeated, but without the addition of 25.4 g of N-butylethanolamine, and with 100 ml of o-dichlorobenzene in place of 80 ml, then only 0.1 g of the same reaction product is obtained, which corresponds to a yield of 0.3% of theory.

EXAMPLE 13

19.6 g (0.05 mol) of perylene-3,4,9,10-tetracarboxylic dianhydride, 68.8 g (0.4 mol) of 4-bromoaniline and 21.0 g (0.2 mol) of diethanolamine in 50 ml of N-methylpyrrolidone are reacted at 160° C. for 3 hours. The crystalline red reaction product with a blue tint is isolated as in Example 1. 33.2 g of the compound of the formula (2) with

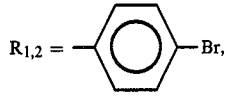

are obtained, which corresponds to a yield of 94.8% of theory.

COMPARISON EXAMPLE 13a

If Example 13 is repeated but without diethanolamine and with the addition of 70 ml of N-methylpyrrolidone in place of 50 ml, then 0.5 g of the same reaction product is obtained, which corresponds to a yield of 1.4% of theory.

EXAMPLE 14

A mixture of 19.6 g (0.05 mol) of perylene-3,4,9,10-tetracarboxylic dianhydride and 42.8 g (0.4 mol) of 3-methylaniline is reacted in the presence of 24.2 g (0.2 mol) of N-benzylmethylamine in 80 ml of nitrobenzene at 180° C. for 2 hours. After the usual isolation (see Example 1), 27.7 g of the red reaction product with a blue tint, of the formula (2) with

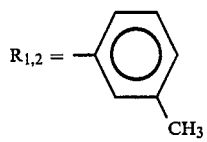

are obtained, which corresponds to a yield of 97.2% of theory.

COMPARISON EXAMPLE 14a

If Example 14 is repeated without the addition of N-benzylmethylamine, but working in 110 ml of nitrobenzene, then virtually no corresponding reaction product is obtained (<0.1 g).

EXAMPLE 15

If Example 9 is repeated but with the difference that 21.8 g (0.25 mol) of morpholine are used in place of 2ethylaminoethanol and the reaction is carried out at 120° C., then 35.6 g of the same reaction product are obtained, which corresponds to a yield of 89.7% of theory.

COMPARISON EXAMPLE 15a

If the process is carried out as in Example 15 but without the addition of morpholine, then virtually no reaction product is formed.

EXAMPLE 16

51.1 g (0.1 mol) of perylene-3,4,9,10-tetracarboxylic monoanhydride mono-4'-ethoxyphenylimide are introduced into a solution of 132 g (1.1 mol) of N-benzalmethylamine and 24.2 g (0.2 mol) of 3,5-dimethylaniline, and the mixture is stirred a 175°–180° C. for 5.5 hours. After working up as in Example 1, 59.5 g of the asymmetrically substituted diimide of the formula (1) with

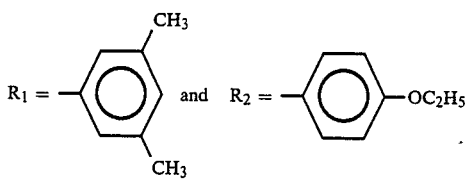

are obtained in the form of crystals which are pure red with a yellow tint, which corresponds to a yield of 96.9% of theory.

The monoanhydride starting compound was prepared as in Example 4 of European Patent No. 0,122,442.

EXAMPLE 17

40.5 g (0.1 mol) of perylene-3,4,9,10-tetracarboxylic monoanhydride monomethylimide, obtained as in Example 1 of German Offenlegungsschrift No. 3,017,185, are reacted in 126 g (1.2 mol) of diethanolamine, after addition of 42.8 g (0.4 mol) of p-toluidine, at 190° C. for 1 hour. The red reaction product with a blue tint, of the formula (1) with

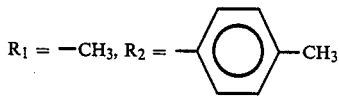

is isolated in accordance with the statements in Example 1.

48.5 g are obtained, which corresponds to a yield of 98.2% of theory.

EXAMPLE 18

49.5 g (0.1 mol) of the perylene-3,4,9,10-tetracarboxylic monoanhydride mono-3,5-dimethylphenylimide, which was prepared as in Example 1 of European Patent 0,122,442, are reacted in a mixture of 42.0 g (0.4 mol) of diethanolamine and 145.2 g (1.2 mol) of 3,5-dimethylaniline at 180° C. for one hour to give the corresponding diimide, which is identical to the β-modification of the product obtained as in Example 2.

58.8 g of the reaction product are obtained in the form of brilliant scarlet-colored crystals, which corresponds to a yield of 98.3% of theory.

EXAMPLE 19

39.2 g (0.1 mol) of perylene-3,4,9,10-tetracarboxylic dianhyride are condensed with 69.0 g (0.5 mol) of 4-nitroaniline in 103 g (1 mol) of propylethanolamine at 55°-160° C. in 4 hours to give the claret-colored diimide of the formula (1) with

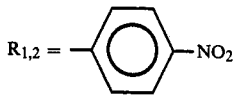

55.3 g of reaction product are obtained, which corresponds to a yield of 87.5% of theory.

EXAMPLE 20

By reaction of 19.6 g (0.05 mol) of perylene-3,4,9,10-tetracarboxylic dianhydride with 70.8 g (0.5 mol) of 5-chloro-2-methylaniline in the presence of 18.8 g (0.25 mol) of monomethylethanolamine are obtained, after a reaction time of 12 hours at 150°-160° C., 25.3 g of the red reaction product of the formula (1) with

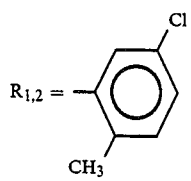

which corresponds to a yield of 79.2% of theory.

EXAMPLE 21

A mixture of 19.6 g (0.05 mol) of perylene-3,4,9,10-tetracarboxylic dianhydride, 49.0 g (0.2 mol) of 3-aminobenzanthrone and 78.5 g (0.67 mol) of N-butylethanolamine is stirred at 190° C. for 4 hours. The mixture is then diluted, at 140° C., with 200 ml of dimethylformamide, and the solid is filtered off with suction at room temperature, washed with dimethylformamide and methanol, and the filter cake which is moist with methanol is treated with hot 5% strength potassium hydroxide solution. After the usual isolation, 55.3 g of dark-red reaction product of the formula (1) with

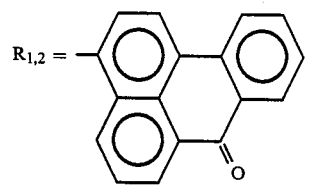

are obtained, which corresponds to a yield of 65.4% of theoy.

We claim:

1. A method for catalyzing the condensation of perylene-3, 4, 9, 10-tetracarboxylic dianhydride or a perylene-3, 4, 9, 10-tetracarboxylic monoanhydride of the formula (2)

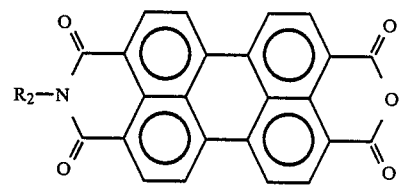

in which $R_2$ denotes a hydrogen atom or a $C_1$-$C_8$ alkyl or phenyl or naphthyl group, which can be substituted on the aromatic nucleus by an alkyl, cycloalkyl, alkoxy, aryloxy, arylazo or nitro group or halogen atom, with a primary arylamine of the formula $R_1$—$NH_2$, wherein $R_1$ denotes a phenyl or Naphthyl group which can be substituted on the aromatic nucleus by an alkyl, cycloalkyl, alkoxy, aryloxy, arylazo or nitro group or a halogen atom, to obtain an arylamide of a perylene-3, 4, 9, 10-tetracarboxylic acid, of the formula (1):

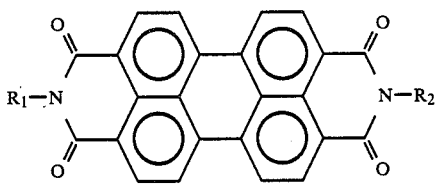

(1)

wherein, if both $R_1$ and $R_2$ are aryl groups, $R_1$ and $R_2$ can be either identical or different;

wherein, the condensation reaction is conducted in the presence of a catalyst system consisting essentially of 0.05 to 5 mole, per mole of perylene-3, 4, 9, 10-tetracarboxylic dianhydride or per mole of the monoanhydride of formula (2), of a dialkylamine of the formula (4)

(4)

in which R' and R" denote identical or different straight-chain $C_1$–$C_6$ alkyl or branched $C_3$–$C_6$ alkyl or $C_5$–$C_6$ cycloalkyl groups, which can be substituted by hydroxyl, $C_1$–$C_4$ alkoxy, $C_1$–$C_4$ alkyl, or phenyl or naphthyl groups, said phenyl or naphthyl groups being unsubstituted or substituted on the aromatic nucleus by $C_1$–$C_4$ alkyl, $C_1$–$C_4$ alkoxy, or $C_1$–$C_4$ alkylamino groups or halogen atoms, and in which the R' and R" can form, together with the nitrogen atom, piperidine, piperazine, morpholine, or pyrrolidine which can be unsubstituted or substituted by a lower alkyl or a phenyl group, the condensation being carried out with continuous removal fo the water of reaction and substantially in the absence of water as an inert diluent.

2. The process as claimed in claim 1, wherein the condensation is carried out in the presence of diethanolamine, alkyl $C_1$–$C_6$-ethanolamine, N-benzylmethylamine, N-benzylethylamine, pyrrolidine, morpholine, piperidine, 2-ethylpiperidine, piperazine or N-methylpiperazine as the dialkylamine of the formula (4).

3. The proeess as claimed in claim 1, wherein the condensation is carried out in the presence of a dialkylamine of the formula (4) with a boiling point from about 100° C. to about 300° C.

4. The process as claimed in claim 1, wherein, after reaction is complete, the reaction product is isolated by removal of the volatile constituents of the reaction mixture by distillation.

5. The method as claimed in claim 1 wherein the said catalyst system is recovered in unreacted form after said arylamide of formula (1) has been obtained.

6. The method as claimed in claim 5 wherein said catalyst system consists essentially of a dialkylamine of the formula, (4) with a boiling point of about 100° C. to about 300° C., and the ctalyst system is recovered by distillation from the reaction mixture.

7. The method as claimed in claim 5 wherein said catalyst system is essentially also the reaction medium and hence is present in large enough quantities to serve as the reaction medium.

* * * * *

UNITED STATES PATENT AND TRADEMARK OFFICE
CERTIFICATE OF CORRECTION

PATENT NO. : 4,831,140
DATED : May 16, 1989
INVENTOR(S) : Ernst Spietschka, et al.

It is certified that error appears in the above-identified patent and that said Letters Patent is hereby corrected as shown below:

Col. 1 line 33 "carboxyates" should read --carboxylates--

Col. 2 line 2 "$C_1-C_8$" should read --$(C_1-C_8)$--

Col. 2 line 4 "nucless" should read --nucleus--

Col. 2 line 36 "$C_1-C_8$" should read --$(C_1-C_8)$-- and "$C_1-C_6$" should read --$(C_1-C_6)$--

Col. 2 line 37 "$C_5-C_6$" should read --$(C_5-C_6)$--

Col. 2 line 38 "$C_1-C_4$" twice appears and should read in both instances --$(C_1-C_4)$--

Col. 2 line 40 "$C_1-C_4$" appears three times and should read in all instances --$(C_1-C_4)$--

Col. 2 line 45 "piperzine" should read --piperazine--

UNITED STATES PATENT AND TRADEMARK OFFICE
CERTIFICATE OF CORRECTION

PATENT NO. : 4,831,140

DATED : May 16, 1989

INVENTOR(S) : Ernst Spietschka, et al.

It is certified that error appears in the above-identified patent and that said Letters Patent is hereby corrected as shown below:

Col. 3 line 10, "$\overline{C_1-C_6}$" should read --$(C_1-C_6)$--

Col. 4 line 32 "lkkewise" should read --likewise--

Col. 5 line 37 "dianhddride" should read --dianhydride--

Col. 7 line 37 "3-chloroanfline" should read
--3-chloroaniline--

Col. 8 lines 64-65 "N-benzalmethylamine" should read
--N-benzylmethylamine--

Col. 9 line 53 "55°" should read --155°--

In Claim 1, line 1 "catalyzing" should read --catalysing--

In Claim 1, col. 12, line 4 "fo the water" should read
--of the water--

In Claim 2, col. 12, line 8 "$\overline{C_1-C_6}$" should read --$(C_1-C_6)$--

UNITED STATES PATENT AND TRADEMARK OFFICE
CERTIFICATE OF CORRECTION

PATENT NO. : 4,831,140

DATED : May 16, 1989

INVENTOR(S) : Ernst Spietschka, et al.

It is certified that error appears in the above-identified patent and that said Letters Patent is hereby corrected as shown below:

In Claim 3, col. 12, line 12 "proeess" should read

--process--

In Claim 6, col. 12, line 27 "ctalyst" should read

--catalyst--

Signed and Sealed this

Seventeenth Day of July, 1990

Attest:

HARRY F. MANBECK, JR.

Attesting Officer

Commissioner of Patents and Trademarks